US006882314B2

(12) United States Patent
Zimmerman et al.

(10) Patent No.: US 6,882,314 B2
(45) Date of Patent: Apr. 19, 2005

(54) CARRIER-BASED DIFFERENTIAL-POSITION DETERMINATION USING MULTI-FREQUENCY PSEUDOLITES

(75) Inventors: Kurt R. Zimmerman, Mountain View, CA (US); Clark E. Cohen, Washington, DC (US); David G. Lawrence, Mountain View, CA (US); Walter C. Melton, Columbia, MO (US); Henry Stewart Cobb, Mountain View, CA (US); Paul Yalden Montgomery, Menlo Park, CA (US)

(73) Assignee: Novariant, Inc., Menlo Park, CA (US)

( * ) Notice: Subject to any disclaimer, the term of this patent is extended or adjusted under 35 U.S.C. 154(b) by 0 days.

(21) Appl. No.: 10/209,782

(22) Filed: Jul. 30, 2002

(65) Prior Publication Data

US 2003/0058163 A1 Mar. 27, 2003

Related U.S. Application Data

(63) Continuation-in-part of application No. 09/769,823, filed on Jan. 24, 2001, now abandoned.
(60) Provisional application No. 60/178,011, filed on Jan. 24, 2000, provisional application No. 60/213,738, filed on Jun. 22, 2000, and provisional application No. 60/233,969, filed on Sep. 20, 2000.

(51) Int. Cl.[7] .............................. G01S 3/02; G01S 1/08
(52) U.S. Cl. ....................................... 342/464; 342/386
(58) Field of Search ........................... 342/464, 357.08, 342/357.03, 385, 386

(56) References Cited

U.S. PATENT DOCUMENTS 6,101,178 A * 8/2000 Beal ........................... 370/336
6,160,837 A * 12/2000 Bruno et al. ................. 375/130
6,271,788 B1 * 8/2001 Longaker et al. ......... 342/357.03

FOREIGN PATENT DOCUMENTS

WO        WO 99/63358 A1 * 12/1999     ............. G01S/5/02

OTHER PUBLICATIONS

Stone, Jonathan et al, "Carrier Phase Integer Ambiguity Resolution Using Dual Frequency Pseudolites,", 11th International Tech. Meeting of the Satellite Division of the ION, Sep. 1998, pp 961–968.*
Forssen, B. "Comparison of wide–laning and tone–ranging," Electronic Letters Aug. 28, 1997, vol. 33, No. 18, pp. 1525–1526.
"The Promise of a Third Frequency", an article from "GPS World" Magazine dated May 1996 by author Hatch.

(Continued)

Primary Examiner—Gregory C. Issing
(74) Attorney, Agent, or Firm—Brinks Hofer Gilson & Lione

(57) ABSTRACT

Apparatus and methods for resolving integer ambiguities in position determination. An embodiment of the invention includes a reference system, augmented with multi-frequency pseudolites using a carrier phase differential GPS implementation, and a mobile system. In one embodiment, the components of the reference system includes one or more multi-frequency pseudolites, one or more multi-frequency reference receivers, a data link standing alone or built into the pseudolites, and the associated antennae for each of these elements. The components of the reference system may be stationary. The mobile system may include a multi-frequency receiver and its associated antennae. Because the mobile systems may passively receive information, an unlimited number of mobile systems may be included in any given embodiment of the invention. A multi-frequency pseudolite uses a single frequency source to synthesize all of the multiple carrier frequencies and all of the multiple base band signals modulated onto carrier frequencies for transmission.

6 Claims, 11 Drawing Sheets

An open-pit mine incorporating a preferred embodiment of the invention

OTHER PUBLICATIONS

"*The Impact of Two Additional Civilian GPS Frequencies on Ambiguity Resolution Strategies*", A conference paper presented to ION in Cambridge Massachusetts, Jun. 28–30, 1999 by Han and Rizos.

"*Carrier Phase Integer Ambiguity Resolution Using Dual Frequency Pseudolites*", a conference paper presented at ION 1998 in Nashville, Sep. 17, 1998 by Stone and Powell.

"*GPS Pseudolite Transceivers and their Applications*", a conference paper presented at ION '99 in San Diego, Jan. 25–27, 1999 by Stone, LeMaster, Powell, and Rock.

\* cited by examiner

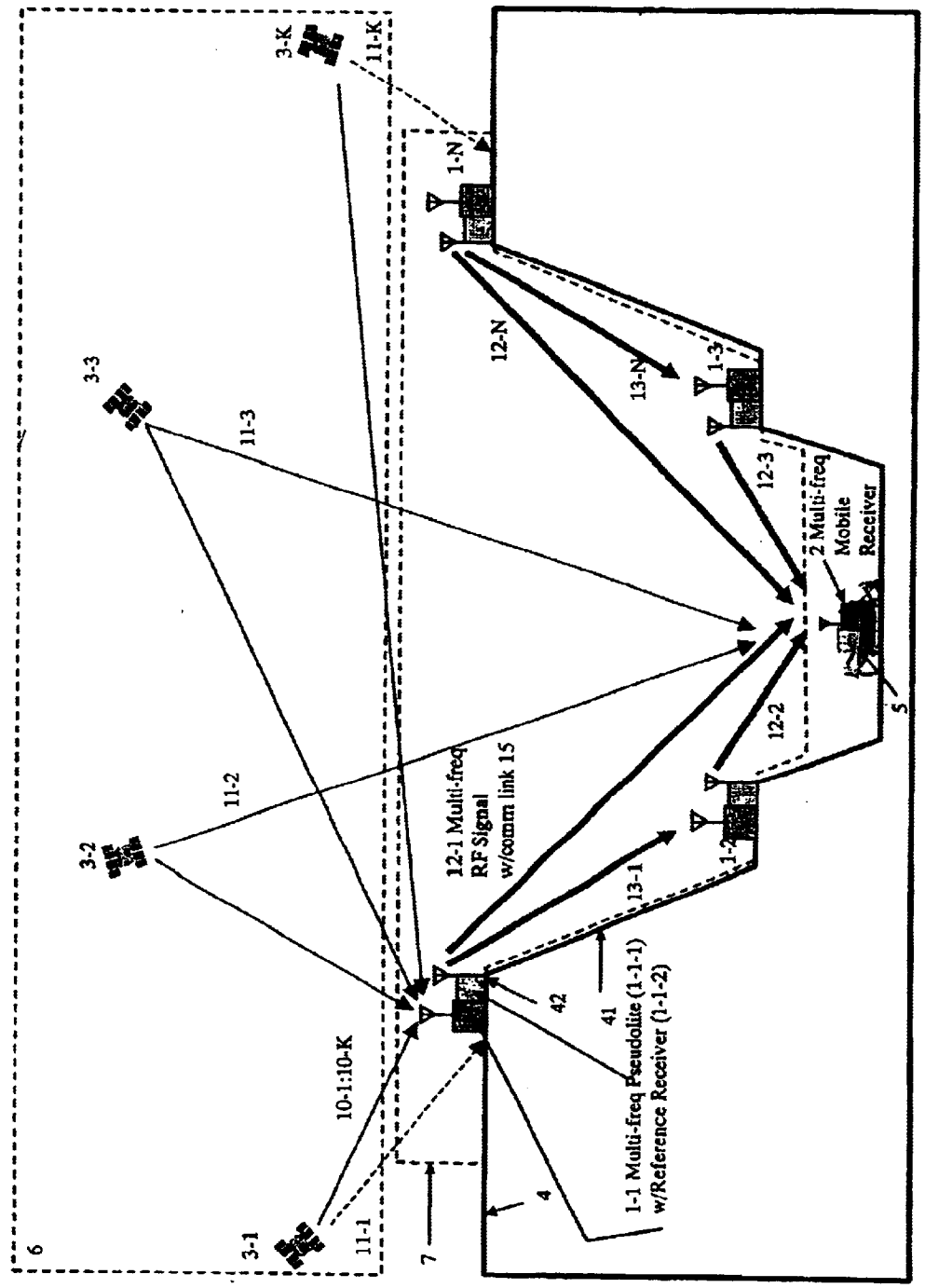
Figure 1: An open-pit mine incorporating a preferred embodiment of the invention

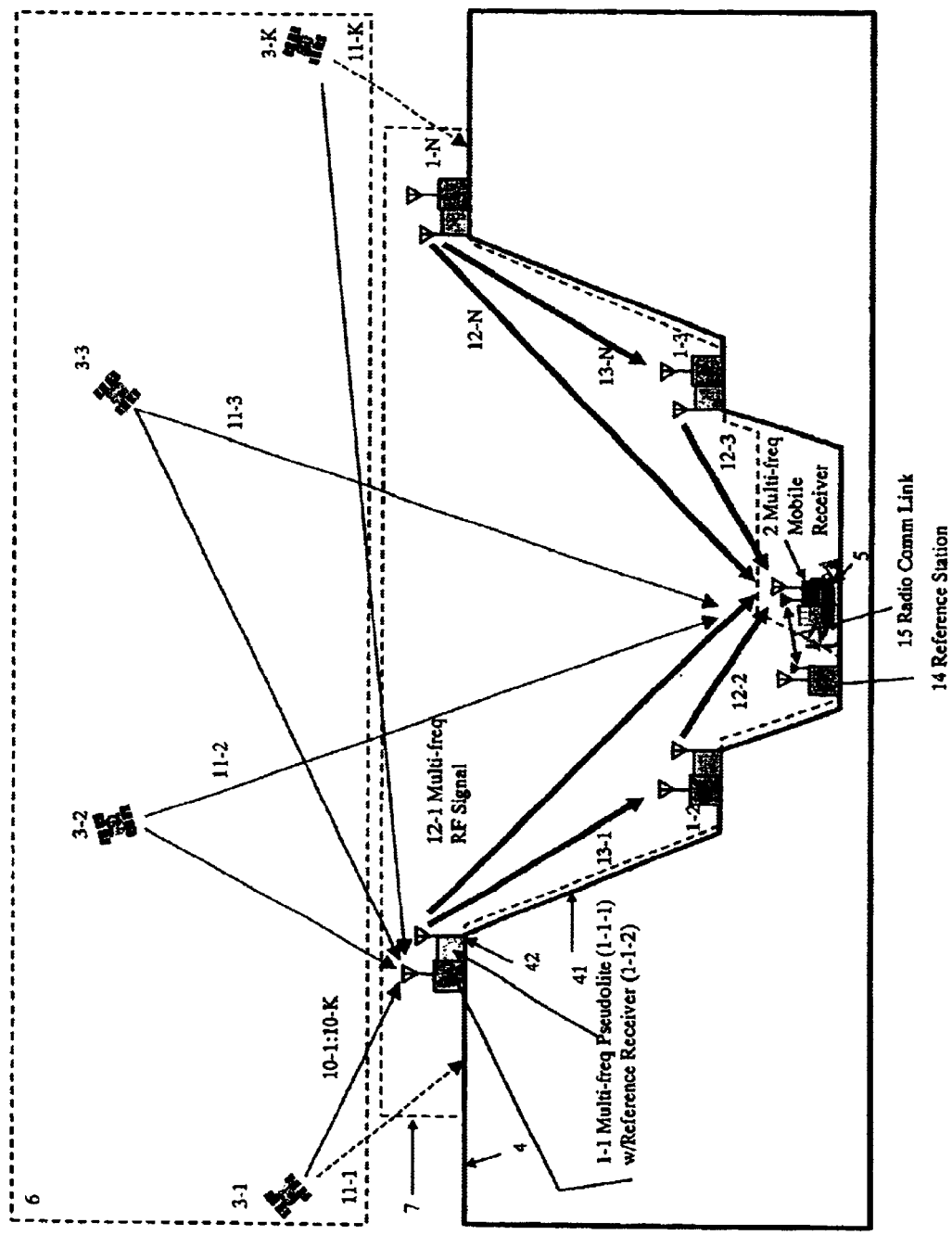
Figure 2: An open-pit mine incorporating another embodiment of the invention

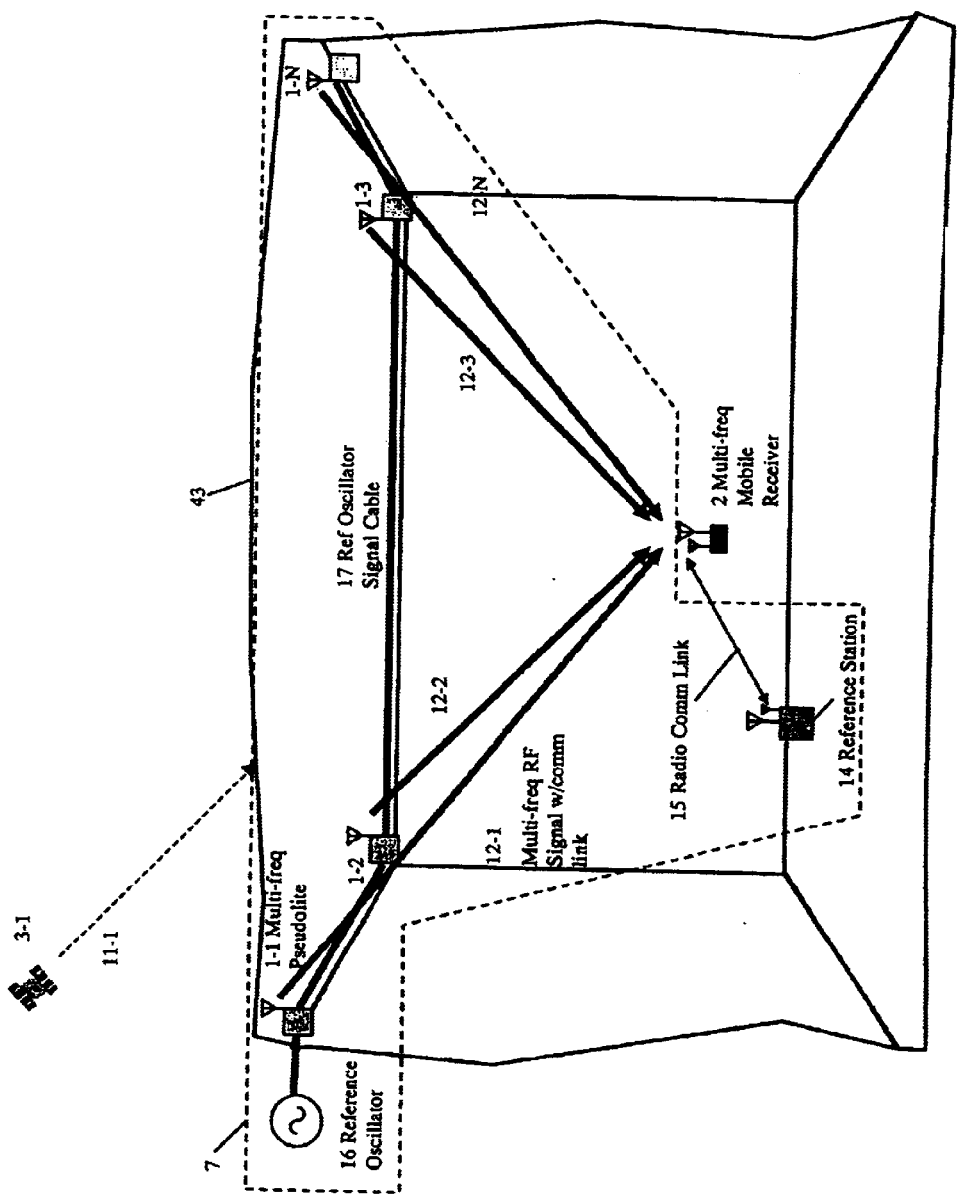
Figure 3: An indoor positioning system incorporating an embodiment of the invention

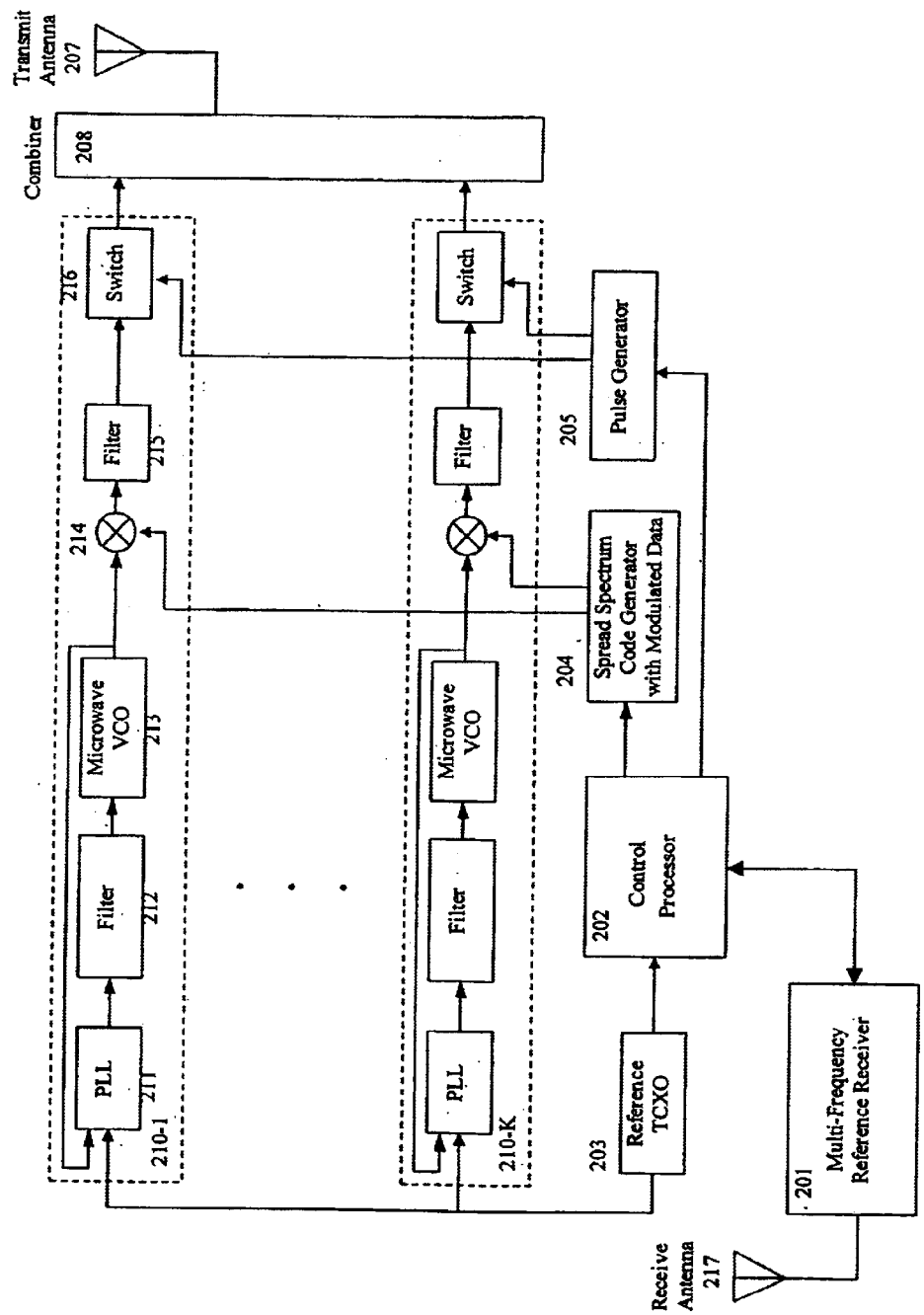
Figure 4: A multi-frequency pseudolite according to one embodiment of the invention

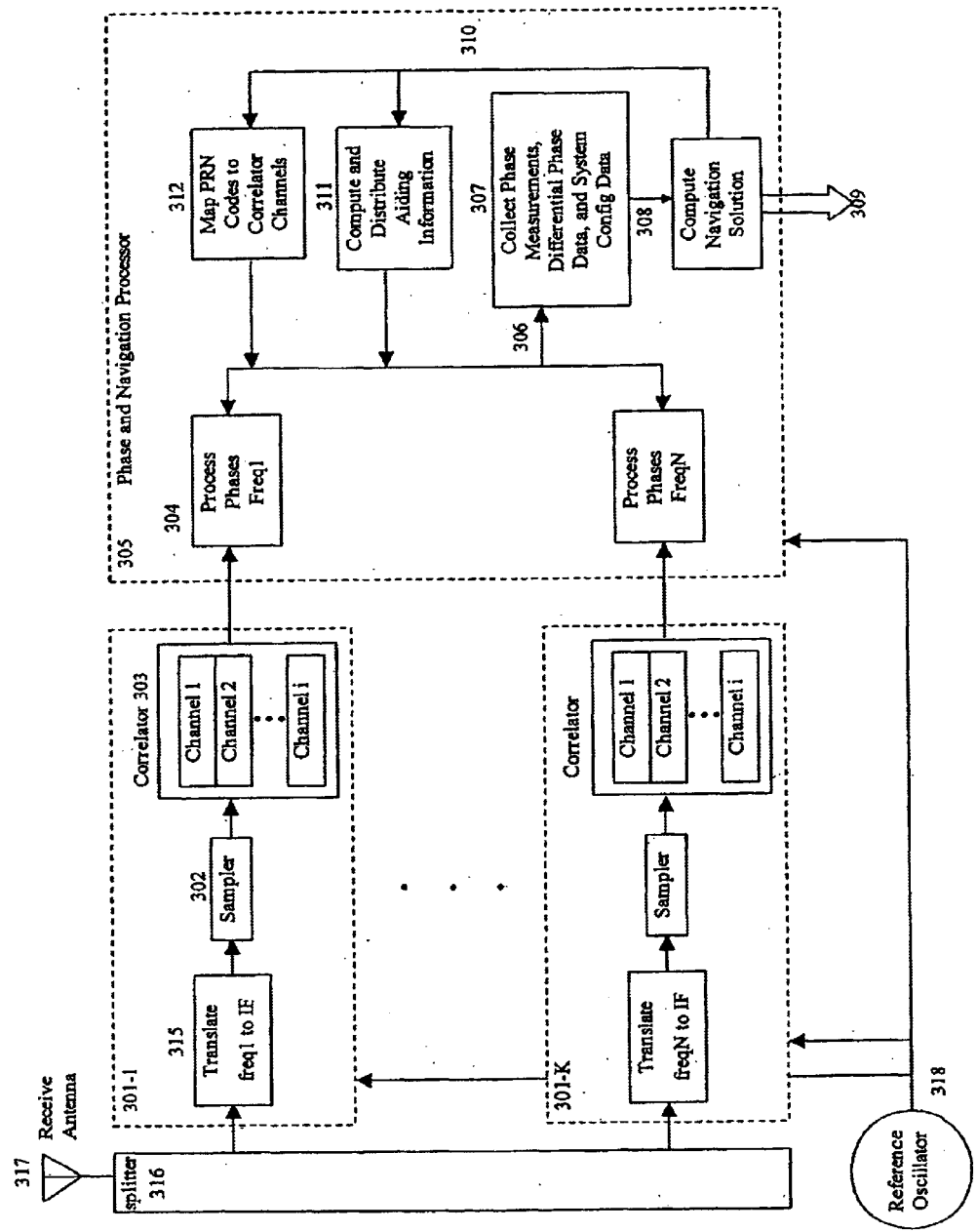
Figure 5: A multi-frequency receiver according to one embodiment of the invention

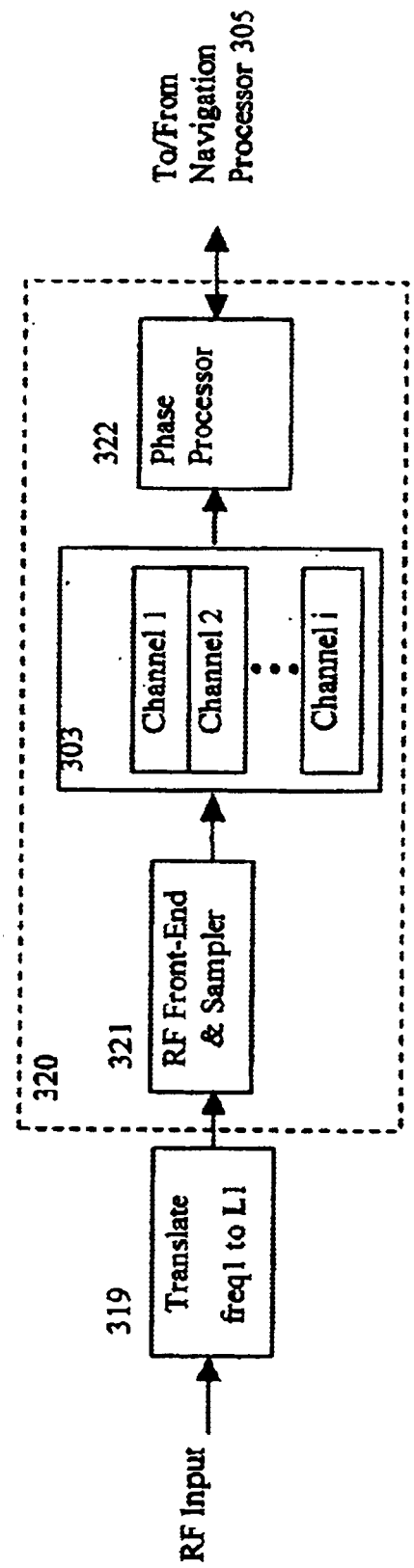
Figure 6: A phase tracking unit using a conventional GPS receiver

Figure 7: A performance matrix for all combinations of satellites and pseudolites

| Number of Satellites in View | | | | | | |
|---|---|---|---|---|---|---|
| 5 | 1 | 2 | 3 | 4 | 5 | 6 |
| 4 | x | 1 | 2 | 3 | 4 | 5 |
| 3 | | x | 1 | 2 | 3 | 4 |
| 2 | | | x | 1 | 2 | 3 |
| 1 | | | | x | 1 | 2 |
| 0 | | | | | x | 1 |
| | 0 | 1 | 2 | 3 | 4 | 5 |

Number of Multi-Freq Pseudolites in View

Legend:
- Immediate Integer resolution
- Enhanced Integer resolution
- Standard Motion-based Integer resolution
- Insufficient for 3-D Navigation N = Number of redundant measurements for integrity monitoring, X = integrity monitoring not possible

CARRIER-BASED DIFFERENTIAL-POSITION DETERMINATION USING MULTI-FREQUENCY PSEUDOLITES

This application is a continuation-in-part of U.S. patent application Ser. No. 09/769,823, entitled "Multi-Frequency Pseudolites for Carrier-based Differential-position Determination," filed Jan. 24, 2001 now abandoned, naming Kurt R. Zimmerman et al. as inventors, being commonly assigned, which claims the benefit of the filing date under 35 U.S.C. §119(e) of Provisional U.S. patent application Ser. Nos. 60/178,011, filed Jan. 24, 2000, 60/213,738, filed Jun. 22, 2000, and 60/233,969, filed Sep. 20, 2000.

The present invention relates generally to positioning systems for vehicles. It relates specifically to precisely determining positions for any land, sea, air, or space vehicle where existing satellite navigation methods such as GPS are inadequate due to limited visibility of its satellites.

This application claims the benefit of the following application:

U.S. patent application Ser. No. 09/769,823, entitled, "Multi-frequency Pseudolites for Carrier-based Differential-position Determination," filed Jan. 24, 2001, naming Kurt R. Zimmerman et al. as inventors, with and commonly assigned to IntegriNautics Corp. of Menlo Park, Calif.

U.S. patent application Ser. No. 09/769,823 is incorporated by reference herein.

BACKGROUND

The Global Positioning System (GPS) is a constellation of satellites operated by the United States government that provides microwave navigation signals to an unlimited number of users. Several methods for interpreting the navigation signals have been used to extract user's location in world or local coordinates with varying degrees of accuracy. Position measurements between two local receivers can be made to meter-level accuracy using GPS differential code phase measurements, and further, centimeter-level accuracy can be achieved between two local receivers using GPS differential carrier phase measurements. Unfortunately, establishing proper carrier phase measurements requires one of several initialization procedures to be performed, any of which depend on the geometric layout of the overall system and motion on the part of either the satellites or the mobile receiver. The initialization process is known as carrier cycle ambiguity resolution or integer resolution and can require that the user wait a few to tens of minutes for the satellites to subtend an appreciable arc along their orbits, or it can require that the user move past a fixed pseudolite transmitter. For some applications, the initialization process is a tolerable inconvenience, for many more general applications the initialization process causes a significant loss of functionality and is unacceptable. This is especially true for applications that depend on very high accuracy, high integrity, and fast, continuous update rate of the position information, which is the case for most heavy machinery control applications.

Pseudolites, or pseudo satellites, have been proposed for use in GPS applications where satellite coverage alone is insufficient to generate a position solution, and therefore some means of augmentation is needed. Also, pseudolites have been used to provide geometric advantage to the positioning system as a whole, such that cycle ambiguities can be resolved in a consistent and reliable manner if the user passes close to the pseudolite. The term "pseudolite" originated in the early design of GPS and even pre-dates the launch of GPS satellites but has been used as an appellation for a variety of devices. A common perception of a pseudolite, though, is that of a ground-based or local transmitter that, from the user's point of view, may be indistinguishably substituted one-for-one for a GPS satellite. The idea of using a pseudolite to facilitate rapid cycle ambiguity resolution is a more recent concept and is a function that arises because of real differences between close-range pseudolites and GPS satellites. Most pseudolite devices that have been built or suggested attempt to adhere to the ideal equivalence between satellites and pseudolites and therefore minimize deviation from the GPS signal plan. This is done hoping that existing GPS receivers may use pseudolites without hardware modification but sacrificing performance.

Several techniques have been used to attain centimeter-level navigational accuracy from GPS and are well known in the art. Each of these techniques uses reconstructed carrier signal(s) to gain finer precision than available from code phase measurements alone. Because the pure carrier signal is ambiguous with respect to carrier wavelengths, special algorithms are used to resolve the ambiguity—a process referred to as "solving for the integers" or "cycle ambiguity resolution". These techniques rely on either satellite motion, motion with respect to pseudolites, or multiple satellite systems (GPS and GLONASS) to resolve cycle ambiguities. In all cases, a reference receiver at a known surveyed location with a data link connecting it to the roaming receiver is required to obtain acceptably rapid convergence to the correct set of integers.

Satellite orbital motion provides geometric diversity of carrier phase measurements when taken by a receiver over a few minutes or more of time. The technique is commonly referred to as Real-Time Kinematic (RTK) GPS. A receiver tracking a single frequency, L1, or both L1 and L2 can employ the technique. When five or more satellites are tracked continuously over a period of time, the code-phase position solution contains at least one redundant measurement. This extra information may be accumulated to eventually overwhelm the number of unknown cycle ambiguities and thus converge on the carrier phase integers. The process works if L1 carrier is tracked alone, or if L1 and L2 carriers are tracked simultaneously. The dual frequency approach converges faster because the L1 and L2 signals are broadcast from a common clock and the frequency separation between L1 (1575.42 MHz) and L2 (1227.6 MHz) provides advantageous observability over L1 alone. Convergence typically takes a minute or more when both L1 and L2 are employed, and may take ten minutes or more when L1 alone is employed.

A similar approach uses both GPS and GLONASS satellites. By using GLONASS satellite signals in addition to GPS signals in the code phase solution, up to twice as many signals can be employed. This increases the number of redundant measurements available to overwhelm the unknown cycle ambiguities. The additional number of satellites increases overall system availability, but the separation between GPS L1 and GLONASS frequencies (1610.6–1613.8 MHz) is much smaller than GPS L1/L2 separation and provides less advantage in terms of convergence time, which may be a few minutes or more.

A mobile receiver passing by one or more pseudolites incurs geometric diversity of its carrier phase measurements in a manner somewhat reciprocal to satellite motion in the RTK technique. In this case, continuous tracking of at least four satellites and one or more pre-surveyed pseudolites provide redundant measurements in the nominal code-phase solution. If significant geometry change occurs relative to the pseudolites, the extra information afforded by the pseudolites may be accumulated to eventually overwhelm the number of unknown cycle ambiguities and thus converge on the carrier phase integers. This method has been used for automatic landing of aircraft, whereby two pseudolites are placed on the ground on opposite sides of the approach path and integers are resolved as the plane flies between the pseudolites on final approach. The drawback of this method is that the vehicle must follow a nominal trajectory past the pseudolites, and the integers cannot be resolved until a significant amount of geometry change has occurred with respect to the pseudolites. In many applications, such as construction and open-pit mining, the vehicles may not move along convenient trajectories to make this technique practical. Again, carrier phase accuracy would not be available for significant periods of time.

The GPS signal structure, being based on an orbiting satellite constellation, has been formed around a very different set of requirements than a local pseudolite constellation would impose. Among these, the range-ratio for a local pseudolite system ought to be much greater than that of GPS, because it shall be desired to operate in close proximity to any one pseudolite in the system, as well as from several kilometers away—the full range over which differential carrier phase is feasible. If a user receiver is to operate as close as 10 m, and as far as 10 km from a pseudolite, the range ratio is 1000:1, which demands the receiver have a dynamic range in power of 60 dB.

The near-far ratio for conventional GPS receivers is firstly limited by the periodicity of the C/A code patterns. Because of the relatively short length, 1023 bits, of the C/A codes, their cross-correlation may exhibit signal to interference (S/I) of −21.6 dB relative to the peak correlation power. A typical GPS receiver requires a minimum S/I of 6 dB to track C/A code, leaving 15.6 dB of margin. The 15.6 dB margin is the maximum power that an interfering signal may be higher than a tracked signal, before disrupting the tracked signal. This 15.6 dB of margin translates to a 6:1 near/far range ratio, much smaller than desired for a pseudolite system. Subsequently, most conventional GPS receivers are designed to operate over only this limited dynamic range.

Accordingly, an object of this invention is to rapidly resolve integer ambiguity—even without significant vehicle motion relative to the pseudolites.

Another object of the invention is to enhance the integrity and speed of the pseudolite technique described above.

Still another object of the invention is to maintain full compatibility and non-interference with existing GNSS signals.

Still another object of the invention is to maintain a significant range of operation for the user receiver, especially allowing operation in close proximity to the pseudolite transmitters.

Still another object of the invention is to operate free of special government licensing.

Still another object of the invention is to leverage conventional GPS equipment, including GPS receivers and pseudolites, to reduce the cost of a system.

These and other goals of the invention will be readily apparent to one of skill in the art on reading the background above and the description below.

Pseudolite systems have been disclosed by Cohen et al., U.S. Pat. No. 5,572,218; Longaker, et al., U.S. Pat. No. 6,271,788; Sheynblat U.S. Pat. No. 5,646,630; Trimble, et al., U.S. Pat. No. 5,708,440 and U.S. Pat. No. 5,686,924; Janky, U.S. Pat. No. 6,198,432; Schellenberg et al., U.S. Pat. No. 5,886,666; Kyrtsos et al., U.S. Pat. No. 5,629,855; Farley et al., U.S. Pat. No. 6,336,076; Schneider et al., U.S. Pat. No. 6,300,898; Mickelson, U.S. Pat. No. 6,031,487; Beal, U.S. Pat. No. 6,101,178; and Gounon et al., U.S. Pat. No. 5,757,314.

U.S. Pat. No. 5,572,218, by Cohen et al., describes a pseudolite system for landing aircraft that relies on vehicle motion past a pair pseudolites on final approach to resolve carrier integer cycle ambiguities, and hence achieve precise position solutions.

U.S. Pat. Nos. 6,271,788 and 5,646,630, by Longaker and Sheynblat, describe an L-band pseudolite positioning system. The invention implies that a conventional GPS receiver can take full advantage of the additional information transmitted by the pseudolites. U.S. Pat. Nos. 5,708,440 and 5,686,924 by Trimble, et al., describe a pseudolite translator that transmits on unlicensed frequencies.

U.S. Pat. No. 6,101,178, Beal, describes a pseudolite system that operates on frequencies other than GPS L-bands and that combines CDMA and TDMA methods to address the near-far problem. The primary application of this patent is locating a cell phone, and it does not disclose a signal plan or a method for immediate resolution of carrier cycle ambiguities for precise positioning.

In all cases, these prior art pseudolite system designs do not provide sufficient methods to attain precise position solutions because they do not provide a dependable way to rapidly resolve carrier cycle ambiguities. The patents describe conventional techniques, such as L1 or L1–L2 Real-Time Kinematic (RTK) survey, which requires satellite motion. Though not discussed in their disclosures, these systems could, at best, use satellite motion for resolving integers and then back-out the solution for pseudolites, which could take several tens of minutes when fewer than four satellites are available. In the worst case, cycle ambiguity resolution may be impossible when there are only pseudolites and no satellites visible, and the mobile receiver is not moving or only moving small distances, as may be the situation for many applications. Therefore, such systems would only be able to provide several-meters of accuracy using code phase measurements.

Further, the Longaker, Sheynblat, and Trimble systems do not describe a signal plan different from the GPS specification, which is known to have limited dynamic range for close-range transmitters, and is regarded as the "near-far" problem. The GPS signal's C/A-code structure provides a signal-to-interference (S/I) ratio of 15.6 dB, which results in a maximum range ratio of about 6:1. Most real implementations exhibit a typical range ratio of more like 3:1 due to non-isotropic antenna gain patterns. A receiver inside the "near zone" of a pseudolite will be jammed from tracking satellite signals and other pseudolite signals by the pseudolite, while a receiver outside the "far zone" will not track the pseudolite signal at all. A system based on the Longaker, Sheynblat, or Trimble designs may have a very narrow intersection of usable space where all pseudolites and satellites can be received simultaneously. Further still, the L-band system described by Longaker and Sheynblat would require special government licensing to transmit on the GPS L-band frequencies.

U.S. Pat. No. 6,198,432, Janky, describes a method for assigning pseudolite PRN codes, based on the assumption that pseudolites ought to use only those from the set of 37 codes assigned by GPS ICD-200.

U.S. Pat. No. 6,336,076, Farley et al., U.S. Pat. No. 6,300,898, Schneider et al., and U.S. Pat. No. 6,031,487

Mickelson, describe pseudolite systems to aid GPS receivers in situations in which the GPS satellite signals are jammed.

U.S. Pat. No. 5,886,666, Schellenberg et al., describe an airborne pseudolite navigation system.

U.S. Pat. No. 5,629,855, Kyrtsos et al., and U.S. Pat. No. 5,757,314, Gounon et al., each describe a GPS-based positioning system that incorporates pseudolites but do not address how to implement a pseudolite system to address known fundamental differences between GPS satellites and pseudolites.

None of the previously disclosed patents describes a pseudolite system that can provide very high utility for a wide variety of applications. Each lacks one or more of the following:

1. Immediate availability of carrier-phase accurate position solutions
2. Full compatibility/non-interference with existing GPS signals
3. Significant range of operation (coverage)
4. License-free operation Multi-frequency GPS receivers have been disclosed by Bogensberger, et al., U.S. Pat. No. 6,016,121; Hanson, et al., U.S. Pat. No. 5,943,363; and Lennen, et al., U.S. Pat. No. 5,923,287 and U.S. Pat. No. 5,805,108.

U.S. Pat. No. 5,923,287, Lennen, discloses a combined GPS/GLONASS satellite receiver. Also, U.S. Pat. No. 5,805,108, Lennen, discloses a multi-frequency receiver that makes use of the GPS L3 signal. The claims in these two patents pertain to satellite systems only, and do not include differing pseudolite methods.

U.S. Pat. No. 5,943,363, Hanson et al., describes a multi-frequency spread-spectrum receiver design that reduces complexity by multiplexing carrier and code phase accumulation and carrier phase removal functions and by moving sum-of-product buffering into RAM.

U.S. Pat. No. 6,016,121, Bogensberger, describes a multiple frequency GPS receiver that is designed to be more efficient in power consumption and circuitry cost than conventional dual-frequency (L1–L2) GPS receivers. Bogensberger's patent claims regard methods to reduce power consumption and overall receiver circuitry for a two frequency (L1,L2) embodiment of the invention.

None of the aforementioned multi-frequency GPS receiver patents consider specific frequencies that a receiver might employ to function with pseudolites, nor how carrier cycle ambiguities might be resolved within a single sample period to achieve centimeter-level positioning. The aforementioned patents, employing only L1 and L2 frequencies (of GPS or GLONASS) would require several measurement samples over at least a few minutes of time while the satellites move in their orbits to attain cycle ambiguity resolution, similar to any conventional dual-frequency GPS/GLONASS receiver.

Multi-frequency positioning systems, not based on GPS, have been disclosed by Flood, et al., U.S. Pat. No. 5,563,612; Spence, et al., U.S. Pat. No. 4,283,726; Mosyakov, et al., U.S. Pat. No. 3,883,873; and Kramer, et al., U.S. Pat. No. 3,040,315.

U.S. Pat. No. 4,283,726, Spence et al., describes a basic distance measuring system that works by measurement of the phase of the beat frequency between two different carrier frequencies. The Spence invention, as disclosed, has many shortcomings as a general positioning technique: (1) The Spence invention requires a unique set of frequencies for every transmitter added to the system; (2) Transmitter clocks are not synchronized, likely to limit accuracy; (3) No data is sent from the transmitter to user, further limiting system flexibility.

U.S. Pat. No. 3,883,873, Mosyakov et al., describes a radio frequency positioning system that employs multiple frequencies and measurements of phases to determine position. The system distinguishes individual transmit stations by time slots. Within each time slot, a sequence of pulses of different frequencies is broadcast. A master transmit station broadcasts an additional carrier to synchronize the entire system. Phases of the multiple-frequency pulses are measured at a receiving station. The phases of the beat frequencies of the multiple-frequency carriers provide a measure of the range from the transmitter to the receiver, and these ranges can be used to determine the position of the receiver.

U.S. Pat. No. 5,563,612, Flood et al., describes a low-power, dual-frequency emergency position indicating radio beacon (EPIRB). The method of position determination for EPIRBs is performed by measuring the frequency Doppler shift of the transmission signal by a group of low-earth orbit or geostationary satellites (COSPAS/SARSAT and INMARSAT). Positioning methods and accuracies of EPIRB technology, particularly 121.5 MHz class B beacons that the Flood patent discloses, are significantly lower than GPS-based methods.

Fundamental differences between GPS and position sensing of EPIRBs via Search and Rescue Satellite-Aided Tracking (SARSAT) include: 1) GPS transmits from satellite to the user; SARSAT transmits from the user to the satellite. Because of this, GPS can support an unlimited number of active users, while SARSAT has a limited number of active users (users are only active during an emergency). 2) GPS signal structure features direct-sequence CDMA encoding and data that enables the user to attain meter-level and even centimeter-level range measurements which can be converted into meter- to centimeter-level position solutions; SARSAT data, sent by the user to the satellite, is reserved for user identification purposes.

U.S. Pat. No. 3,040,315, Kramer, describes a two-frequency system that measures range by the phase difference between the radiation field and the induction field of a low-frequency signal, while using the radiation field of the high-frequency signal as a reference. The Kramer design would not likely achieve the accuracy of a GPS-based system for several reasons, including system clock accuracy and synchronization, distortion at close range, diminishing observability at far range, and variation of user antenna pattern and orientation.

The proposed signal structures of the aforementioned positioning systems are significantly different from code-division spread spectrum methods employed by GPS and may restrict overall system capability, including number of transmitters recognized by a receiver, number of transmitters that can be deployed, range and accuracy of these systems.

SUMMARY

Herein are described apparatus and methods for position determination of a mobile receiver, characterized by: (1) Immediate availability and integrity of the position information to an accuracy of a fraction of a wavelength of the highest frequency carrier; (2) Full compatibility and non-interference with GPS or other Global Navigation Satellite Systems; (3) License free operation; and (4) Significant range of operation. An embodiment of the invention includes a reference system, augmented with multi-frequency pseudolites using a carrier phase differential GPS implementation, and a mobile system.

In one embodiment, the reference system may include one or more multi-frequency pseudolites, one or more multi-frequency reference receivers, a data link that is either stand-alone or built in to the pseudolites, and the associated antennae for each of these elements. The components of the reference system may be stationary.

The mobile system may include a multi-frequency receiver and its associated antennae. Because the mobile systems may passively receive information, an unlimited number of mobile systems may be included in any given embodiment of the invention.

A multi-frequency pseudolite uses a single frequency source to synthesize all of the multiple carrier frequencies and all of the multiple base band signals modulated onto carrier frequencies for transmission. The relative timing of all of the carriers and base band signals is constant and stable so no unknown timing drift exists between any of these signals.

In a preferred embodiment, the modulation is a bi-phase pseudo random noise (PRN) sequence from the same family of Gold Codes or P-code used by the GPS satellites and the same code is used for all of the several carrier frequencies for any particular pseudolite. Different PRN values are used for the different pseudolites. The modulation timing is continuous for each pseudolite. In a second embodiment, the actual transmission of the modulated signals may be pulsed so that the pseudolites do not interfere with each other at the various system receivers.

In the preferred embodiment, the multi-frequency pseudolite includes a multi-frequency reference receiver for synchronizing the transmitted pseudolite signals with the GPS system. This establishes coordination between all of the pseudolites in a given local implementation, enabling exclusive use of very long code sequences, such as P-code. In a second embodiment, synchronization allows the pseudolites to be programmed to not overlap their pulsed transmissions. The integrated GPS receiver also surveys the location of the multi-frequency pseudolites.

In the preferred embodiment wherein each pseudolite is joined with a multi-frequency reference receiver, the receiver phase tracks all available GPS satellite signals and its associated pseudolite signal and sends that data over the pseudolite's ranging signal. The mobile receiver then acquires this data directly from the RF ranging signals, similar to the way GPS sends satellite information at 50 baud as is known in the art. In other embodiments, where the multi-frequency reference receiver is independent of the pseudolites, the receiver not only tracks all available GPS satellites but all available multi-frequency pseudolites as well. The data in this case is relayed to the mobile receivers via a separate radio communication link.

In one embodiment, the mobile receivers have functionally equivalent hardware and software as the reference receivers. They also receive through their associated antennae, to the extent possible, all of the same pseudolite and GPS satellite signals received by the reference receivers but limited by line-of-sight restrictions due to surrounding obstacles. They also have software for assimilating the reference receiver phase information received over the data link from the reference receiver. The mobile receiver software combines the relative phase information for all of the pseudolite and GPS satellite signals it has itself measured with the relative phase information for all of the pseudolites and GPS satellites that it has received over the data link from the reference receiver to then determine the wavelength integer ambiguities, thereby computing its position relative to the reference receiver position to an accuracy with errors on the order of only a fraction of a wave length of the highest carrier frequency (around 1 centimeter). By using the multiple frequencies from the several pseudolites in view, the resolution of the wavelength integer ambiguities is nearly instantaneous (within one measurement cycle, typically 0.1 seconds or less) because it does not require a geometry change to accumulate due to either mobile receiver or GPS satellite motion to resolve the ambiguities.

BRIEF DESCRIPTION OF THE DRAWINGS

FIG. 1: illustrates an open-pit mine incorporating an embodiment of the invention FIG. 2: illustrates an open-pit mine incorporating another embodiment of the invention FIG. 3: illustrates an indoor positioning system incorporating an embodiment of the invention FIG. 4: illustrates a multi-frequency pseudolite according to one embodiment of the invention FIG. 5: illustrates a multi-frequency receiver according to one embodiment of the invention FIG. 6: illustrates a phase tracking unit using a conventional GPS receiver FIG. 7: shows a performance matrix for combinations of satellites and pseudolites

DESCRIPTION OF SPECIFIC EMBODIMENTS

Figure 8:
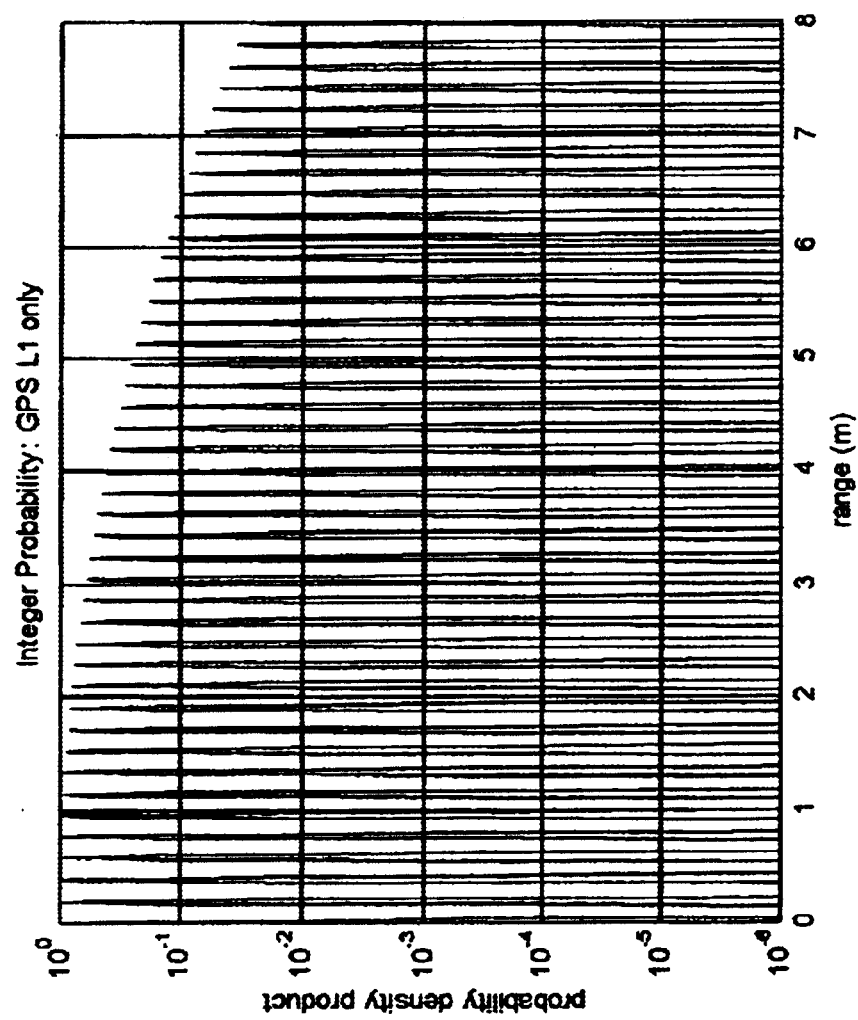
FIG. 8: shows the cycle ambiguity probabilities for GPS L1

The invention diverges from the GPS signal plan specification more than previous inventions. Performance objectives include:

Immediate availability and integrity of carrier-phase accurate position information Full compatibility and non-interference with existing GPS signals License-free operation Significant range of operation (coverage)

The first objective, immediate availability and integrity of carrier-phase accurate position information, is essential for machinery control applications that depend on position information to drive a machine in life-critical situations. Carrier-phase accurate positioning is defined here to mean that the position measurement is accurate to a fraction of a wavelength of the highest frequency carrier in the signal plan. For GPS, where the L1 signal wavelength is roughly 19 cm long, a carrier-phase accurate position measurement is typically 1–2 centimeters. This shall also be regarded as a precise position measurement. Immediate availability means that the position information is available as soon as the user receiver has view of a sufficient number of pseudolites. To achieve this, the receiver locks on to the available pseudolite signals and extracts unambiguous, carrier phase-accurate ranges as quickly as possible. The shortest amount of time in which a receiver can obtain the necessary measurements is within one update period from the differential reference station plus one sample period of the locally received phase data. A typical update period of data from a reference station over a data communication link is two seconds. A typical update period for locally received phase data is one tenth of a second. Therefore, immediate availability is defined here to mean within three seconds of sighting a sufficient number of pseudolites. Immediate integrity means that the position measurement also comes with a measure of how likely it is to be correct, and that probability is at its maximum level for the immediately available position information. Full compatibility and non-interference with existing GPS signals means that the system does not cause degradation of GPS performance, regardless of proximity to ground transmitters or other equipment in the system. License-free operation means that special governmental permission is not required to operate the system. Significant range of operation means that the system is available over a large workspace and unencumbered by dynamic range issues such as the "near-far" problem that exists with GPS.

The carrier phase integer search space is bounded by the accuracy envelope of the code phase. The greater the accuracy of the code phase, the smaller the carrier phase integer search space. Code phase accuracy improves in proportion to the chipping rate for DGPS, because DGPS error is dominated by multipath noise, which varies in proportion to chipping rate. Therefore, the invention may employ a variation to the nominal GPS spreading code scheme, as well as multiple frequencies, to facilitate rapid integer ambiguity resolution.

The invention operates on multiple ISM-band (license-free, non-GPS) frequencies, referring to the signals transmitted by the pseudolites. The described user receiver maintains GPS L-band capability to receive satellite signals, in addition to ISM-band capability to receive pseudolite signals.

The invention addresses how to achieve centimeter-level accuracy using differential carrier phase measurements and an algorithm for quickly discerning carrier cycle ambiguities.

The invention discloses two ways to address the near-far problem: one that involves exclusive use of very long code sequences, and another that employs synchronized pulsing of each of the pseudolite's transmitted signals.

The invention differs from aforementioned multi-frequency GPS receiver patents in the purpose for reception of multiple frequencies. The invention specifies a frequency plan chosen to provide immediate cycle ambiguity resolution (i.e. one sample of the phase measurements) and hence immediate centimeter-level accuracy. An embodiment of the invention establishes a set of frequencies from the license-free ISM bands, and therefore demonstrates an implementation that can be used without special FCC licensing for use of L1, L2, or L3 band frequencies.

System Configuration

Three embodiments of the invention are shown in FIGS. 1–3. In all embodiments, the multi-frequency pseudolite system 7 includes:

Ranging-signal providers for providing ranging signals 12-1:12-N to supplement a global navigation satellite system (GNSS), by way of multi-frequency pseudolites 1-1:1-N, where N is the number of pseudolites;

A ranging-signal synchronizer for synchronizing the ranging signals, in terms of their underlying code and carrier signals and possibly their pulsing sequence. This may be accomplished with a reference receiver attached to the pseudolite transmitter (embodiments FIG. 1 and FIG. 2, 1-1-1, 1-1-2) or a single reference oscillator and connecting cable (figures 3, 16 and 17);

A transmitter for collecting and sending reference phase measurements to a user receiver. This may be accomplished with a reference station and a data communication link. The reference station may exist as a distributed set of reference receivers (FIG. 1, 1-1-2), each connected to a pseudolite, and in which case the communication link exists as data modulated along with the aforementioned ranging signals 12-1:12-N. The reference station may alternatively exist as a separate reference receiver and the data communication link exist as a set of radio modems, one at the reference station, and one at the user receiver (figures 2 and 3, 14 and 15).

FIG. 1 illustrates an open-pit mine incorporating an embodiment of the invention. The mining application may include a pit 4, a mining vehicle 5, a global navigation satellite system 6 of the art and a multi-frequency pseudolite system 7.

The pit 4 has walls 41 and a rim 42. The pseudolites may be to ensure that four or more pseudolites 1-$i$ ($i$<=N) are available and provide good geometric dilution of precision (a factor of 15 or less, preferably less than 5) to a user in the work space below—around the rim 42, for example.

Where no satellites are visible to a user, the invention may operate using only pseudolite signals, as described herein.

The mining vehicle 5 includes a MFPS receiver 2. An MFPS receiver 2 recognizes and uses signals from the MFPS 7. Anything using a MFPS receiver 2 is a "user" of the MFPS 7, as the term is used herein. Typically, a user carries a multi-frequency mobile receiver 2 to determine its position.

The satellites 3-1:3-K of any available global navigation satellite system (GNSS) may be incorporated. GPS is the most likely, but GLONASS may be included, as well as any future such systems. The satellites 3-1:3-K of the GNSS system 6 may respectively broadcast signals 10-1:10-K and 11-1:11-K. The signals 10-1:10-K travel along a straight line towards a pseudolite 1-$i$ of the pseudolite system 7 while the signals 11-1:11-K travel along a straight line towards a vehicle MFPS receiver 2.

The surrounding terrain 41 may block some portion of the GNSS signals 11-1:11-K, creating the need for the pseudolites. The mobile receiver 2 may use the remaining portion of the GPS signals 11-1:11-K to improve the ultimate position solution.

Another portion of the GNSS signals 10-1:10-K may be used to survey the locations of the highest-elevation pseudolites 1-$j$ and to synchronize the system. Lower-elevation pseudolites (pseudolites 1-2 and 1-3, for example) may need signals from upper-elevation pseudolites (pseudolites 1-1 and 1-N, for example) for survey and synchronization purposes.

Additional System Configuration Embodiments

FIG. 2 illustrates an open-pit mine incorporating another embodiment of the invention. The embodiment may include a pit 4, a mining vehicle 5, a global navigation satellite system 6 of the art and a multi-frequency pseudolite system 7, as well as a multi-frequency reference station 14 separate from the multi-frequency pseudolites of the MFPS 7. The reference station 14 includes a reference receiver 2. (This embodiment may prove technically easier to implement in a real application of the invention than that of FIG. 1).

With line-of-sight visibility to all of the same pseudolites and satellites that all of the mobile receivers have available, the reference station 14 may serve the entire work space. The reference receiver 2 may collect differential code and carrier phase information and satellite ephemeredes and distribute these to users' mobile receivers 2 via a radio communications link 15 independent of the pseudolites.

FIG. 3 illustrates an indoor positioning system incorporating an embodiment of the invention. In this instance, no satellites are visible, as blocked by an enclosure 43. An oscillator 16 connected through one or more cables 17 to pseudolites 1-*i* may synchronize the pseudolites 1-*i*.

One skilled in the art could readily see application of the system to other environments to those shown, particularly including positioning in urban canyons, construction sites, or areas of heavy foliage.

A Multi-Frequency Pseudolite Signal Plan

A multi-frequency pseudolite signal plan must achieve the following objectives:

Immediate availability and integrity of carrier-phase accurate position information Full compatibility and non-interference with existing GPS signals License-free operation Significant range of operation (coverage)

These objectives may be achieved through the use of two or more frequencies from the Industrial, Scientific, and Medical (ISM) bands, which include 902–928 MHz, 2400–2483.5 MHz, and 5725–5875 MHz. It shall be shown that immediate cycle ambiguity resolution can be accomplished using just two frequencies when code chip rates are much higher than GPS chip rates. Alternatively, a three-frequency scheme that uses standard GPS codes and chip rates could accomplish the same objective.

It may be advantageous to use GPS code sequences, including C/A codes and P-code, since their properties are well understood and chipsets exist for these codes.

It may also be advantageous to use a master clock rate of 10.23 MHz and carrier frequencies that are multiples of 10.23 MHz to maintain code-carrier phase coherence, particularly if C/A codes are used.

Table 1 summarizes the signal plan objects and design options to achieve each objective. At least two approaches exist to achieve immediate cycle ambiguity resolution. The preferred embodiment is a two frequency design in which code chip rates are much higher than those used by GPS; a second embodiment is a three frequency design in which standard GPS chip rates are employed. The primary trade-off between these two approaches is the degree to which one wants to use existing GPS chipsets and design constructs. At least two approaches exist to achieve large range of operation, also. The preferred embodiment is to use non-periodic codes and a receiver designed for a very wide dynamic range. P-code may be considered non-periodic because it is 38-weeks long. A second embodiment may use C/A codes in conjunction with time division multiplexing to get an artificial, though effective expanded dynamic range out of a more conventional GPS-like receiver design. Again, the primary trade-off between these two approaches is the degree to which one wants to use existing GPS chipsets and design constructs. The use of ISM band frequencies obviously meets the license-free and GPS compatibility objectives.

The requirement for immediate availability and integrity of carrier phase-accurate position information implies that unambiguous ranges, based on carrier phase measurements, must be derived from a single sample period of data. In the case of code and carrier phase measurements of a single frequency CDMA signal, the only discernment between one carrier cycle and another comes from the probabilistic bounding imposed by the code phase measurement. Better code phase accuracy results in easier discernment between the correct carrier cycle and extraneous cycles. Code phase accuracy can be improved roughly in proportion to code phase chipping rates. Another way to improve discernment is to add more CDMA signals at different frequencies to the system.

The multi-frequency signal plan for the preferred embodiment of the invention therefore shall adhere to the following design considerations:

The carrier frequencies shall be chosen such that the resulting modulated CDMA signals are completely contained within the ISM bands.

The spreading codes shall be of the same category of codes used for GPS: either C/A code or P-code.

The code chip rate may be any integer factor of the carrier rate, so as to maintain code-carrier phase coherence.

Table 2 lists candidate frequencies and code chipping rates that may comprise a multi-frequency pseudolite signal plan, based on a 10.23 MHz master clock ($f_o$) and minimum 1.023 MHz chip rate ($f_c$).

The preferred embodiment, a two-frequency signal plan, is comprised of 902.70 MHz (90*$f_o$) and 2455.20 MHz (240*$f_o$) carrier signals, with P-code modulated on the first carrier at chipping rate 6.138 MHz (6*$f_c$) and P-code modulated on the second carrier at chipping rate 25.575 MHz (25*$f_c$).

Another embodiment, which may be very simple to implement with off-the-shelf GPS hardware, is a three-frequency signal plan comprised of 910.47 MHz (89*$f_o$), 2404.05 MHz, (235*$f_o$) and 2475.66 MHz (242*$f_o$) carrier signals and uses only C/A codes at nominal chipping rates.

The expected performance of any set of frequencies to uniquely discern the correct integers can be determined by computing the probability of a cycle ambiguity occurring within the envelope of the code phase accuracy. The ability to reject erroneous integer cycle solutions using the two example frequency sets can be compared with the conventional GPS widelane technique by observing the graphs of the cycle ambiguity probability versus range. The cycle ambiguity probability for a single-frequency system is shown in FIG. 8 as a nominal case.

This semi-logarithmic graph shows that carrier phase alone does not distinguish between being at range 0 as opposed to range 0.19 m, 0.38 m, 0.57 m, etc. Each spike (except for the one at zero) is a potentially wrong selection for the carrier cycle resolution algorithm. The only discernment of range comes from the code phase probability envelope, which in this case is modeled conservatively as a normal distribution with a standard deviation of 3 m. The width of each spike represents the carrier phase noise, modeled here as a normal distribution with a standard deviation of 4% of a carrier cycle, or 0.75 cm for L1. The ability to suppress cycle ambiguities in a multi-frequency system is a function of code and carrier phase noises, as well as the frequencies themselves.

Figure 9:
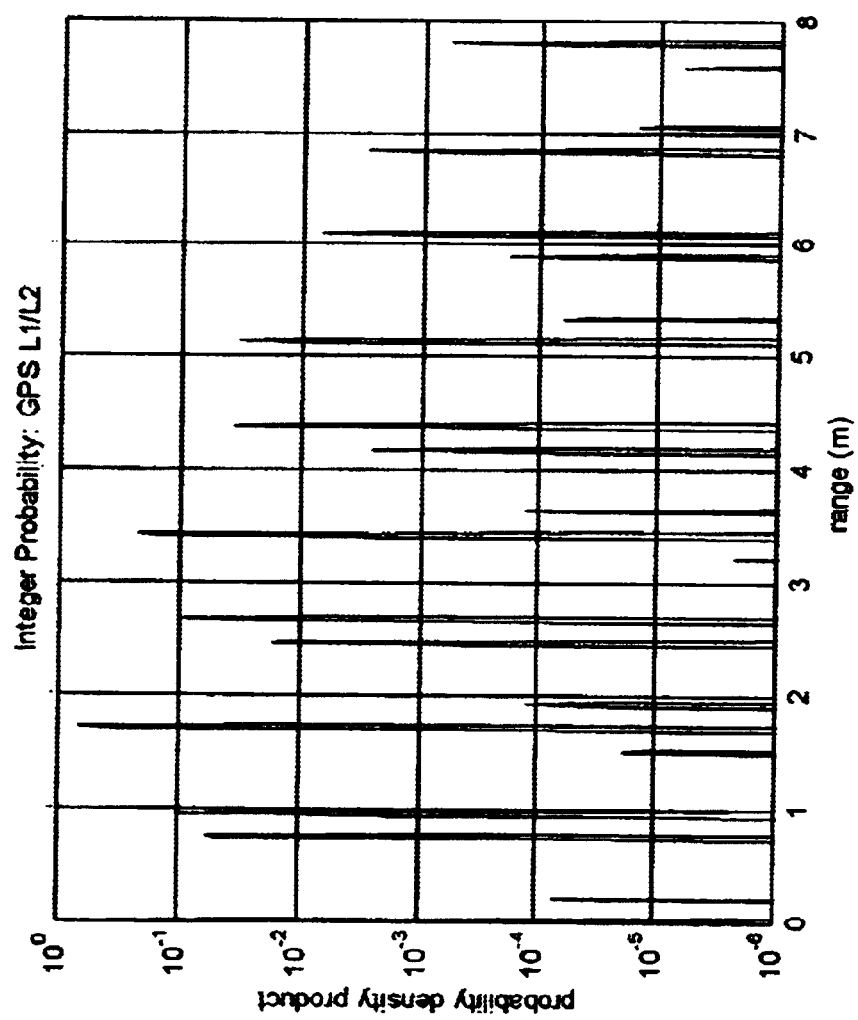
FIG. 9: shows the cycle ambiguity probabilities for GPS L1 & L2

FIG. 9 shows the benefit of the dual-frequency (or widelaning) GPS receiver. The superimposed cycle ambiguity probability functions of L1 and L2 reduce the possible integer solutions substantially, but not enough to completely obviate the need for satellite motion to discern the correct cycle. This is therefore still not adequate for a high-integrity motionless solution.

Figure 10:
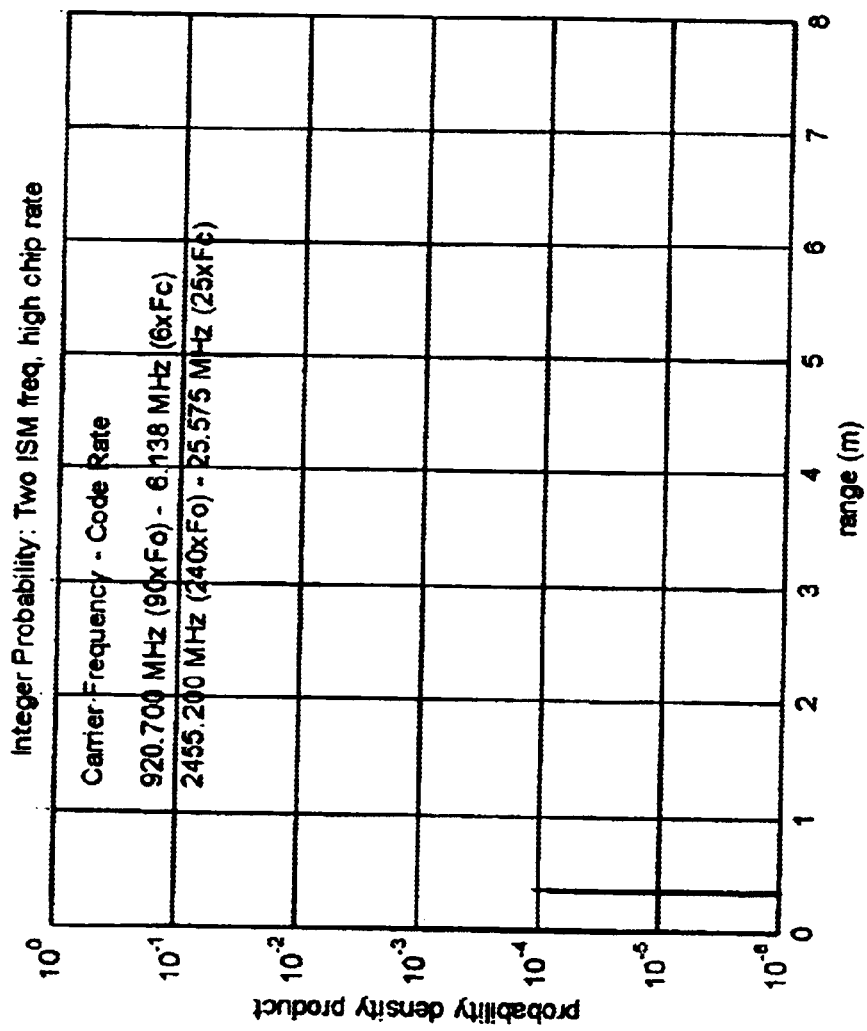
FIG. 10: shows the cycle ambiguity probabilities for a two-frequency system with high code chip rates
Figure 11:
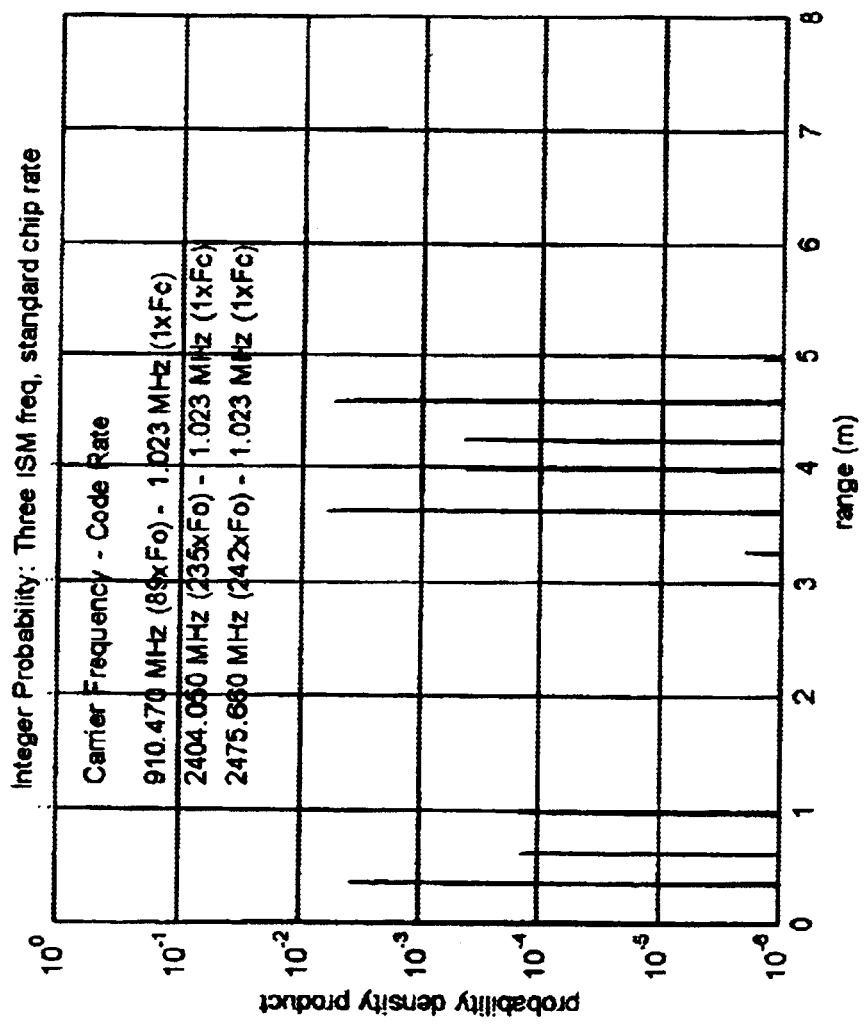
FIG. 11: shows the cycle ambiguity probabilities for a three-frequency system with standard code chip rates

Even with no motion in the system, the two-frequency, high-chipping rate and three-frequency, nominal chipping rate designs can reduce the probability of selecting an incorrect cycle ambiguity to better than 1 in 10,000 and 1 in 100, respectively, as shown in FIG. 10 and FIG. 11. This substantial improvement over the dual-frequency system provides the ability to resolve position to better than 10 cm in one measurement period. Integrity monitoring via redundant measurements readily discerns the unlikely event of an incorrect cycle ambiguity in either exemplary signal plan.

As discussed in the background section, the near-far ratio of GPS L1 is roughly 6:1. This is a limitation caused by the cross-correlation properties of the C/A code. Most commercial receivers are designed to handle only this limited dynamic range. For a pseudolite system, the near-far ratio must be made much greater than 6:1. If a user receiver is to operate as close as 10 m, and as far as 10 km, then the near-far ratio must be expanded to 1000:1, or 60 dB in power. The operating range of the multi-frequency pseudolite system can be made very large by at least two methods: (1) employing codes much longer than C/A code in the signal plan and building the user receiver to have a very wide dynamic range, or (2) using standard GPS C/A code, pulsed in a TDMA manner, while maintaining a receiver design much more akin to conventional GPS receivers.

In the first case, using P-code exclusive of C/A code on all carriers will eliminate the cross-correlation shortcomings of the C/A code, and thus provide the dynamic range required. A discussion of P-code signal-to-interference ratio can be found in Parkinson, B. W. and Spilker, J. J. Jr., eds., *Global Positioning System: Theory and Applications I*, volume 163 of *Progress in Aeronautics and Astronautics* (AIAA, 1996). The P-code sequence is 38 weeks long in total and transmitted at a nominal chip rate of 10.23 MHz. GPS satellites all use the same P-code sequence, starting from different 1-week intervals in the sequence, thus effectively attaining 38 different codes. The P-code may be divided up over much shorter intervals for pseudolites, perhaps 10 seconds apart to attain a much greater number of codes (2.3 million for 10 second intervals).

For an all P-code pseudolite system to work, the user receiver must have from a cold start a fairly good estimate of "system time" (presumably GPS time) in order to establish a reasonably narrow search space over the P-code sequence. Fortunately, the carrier signals broadcast by the pseudolites will already be accurately synchronized to GPS and the code-carrier search space will be quite narrow. The user receiver ought to be able to get a fairly accurate time estimate, say to within one second of system time, either over the data communication link (in the case of a separate radio network) or by some other means designed into the system (e.g. GPS, if any satellites are visible to the user). In any case, assuming a receiver has cold-start time accurate to one second, a code correlation pre-detection interval of 0.1 milliseconds (representing about 1000 chips of P-code), and only searches directly on frequency, then it ought to take on the order of one minute from a cold start to lock on to a first pseudolite. This search time ought to further be divided by the number of receiver channels and the number of frequencies, as advantage will be gained by searching all channels from different code offsets. Once any one pseudolite signal is locked, or at least one GPS satellite is tracked, the receiver will know system time to better than one millisecond and can quickly lock on to all other available pseudolite signals.

It is worth noting that any number of pseudo-random noise codes with suitable auto- and cross-correlation properties might suffice in place of P-code in this discussion. For example, Gold codes of greater length than the 10-bit C/A codes could be used. The cross-correlation properties for a general-length Gold code can be calculated as specified in Parkinson and Spilker. A 17-bit Gold code, length 131,071 chips, could provide 70 dB of cross-correlation margin.

An alternative design that will provide users a significant operating range, but does not require long codes like the P-code system described above, is based on time-division multiplexing each pseudolite's transmissions. This method has been referred to as "pseudolite pulsing" in published literature, but in essence it is a time division multiple access (TDMA) technique. A pseudolite broadcasting with high power for a short duty cycle, say 10%, will be tracked by a user receiver with great clarity for the entire 10% cycle, while all other satellite signals are suppressed by the pseudolite's interference. During the other 90% of the cycle, the receiver may track the satellites as normal, with little more than 10% loss in signal to noise ratio. This TDMA method works to expand the near-far ratio of pseudolite-only systems, as well as combined satellite and pseudolite systems. The pseudolite pulsing method has been used successfully for single-frequency L1 C/A-code pseudolites, expanding the near-far ratio to at least 100,000:1. See H. Stewart Cobb, Ph.D., "GPS Pseudolites: Theory, Design, and Applications" (Stanford University, 1997). The technique may be applied to multi-frequency pseudolites by pulsing each of the separate CDMA signals in accordance with a known pulsing pattern, discussed below. A shortcoming of this method is that only a limited number of pseudolites can be deployed in a given area before all of the available time slots are filled.

The ability of a receiver to properly respond to the rapid changes in power caused by pulsed pseudolites depends on the receiver's automatic gain control (AGC) bandwidth and needs to be taken into consideration if pseudolite pulsing is employed by the system.

By necessity, all pseudolites employing a TDMA pulsing scheme must be synchronized in some manner. Synchronization can be accomplished through a number of means already discussed in the system description, including accompanying each pseudolite with a GPS receiver or connecting all the pseudolites to a common oscillator, if the configuration permits.

The pulse sequence pattern for a C/A code pseudolite should be designed such that the entire sequence of the C/A code gets transmitted with some periodicity. A pseudorandom pattern defined by the RTCM-104 committee may be a suitable pattern. The RTCM pattern defines 11 possible "slots" in a C/A code, each 93 chips long. A pulse is transmitted in one of these slots during each C/A code epoch (one millisecond), and the sequence repeats every 200 epochs. See *Global Positioning System*, volume 3 (Institute of Navigation, Washington, D.C., 1986). A variation of the RTCM pattern, in which the pattern is adapted to three pulses or five pulses per epoch, (each pulse being one third or one fifth the width defined by RTCM), has been shown to provide better performance empirically, and would be preferred in any embodiment of the invention in which pseudolite pulsing is employed.

Narrower pulse-on times are desirable to allow for more pseudolites to be used in a given area, but each slot must also be wide enough to allow for the receiver's pre-detection interval to accumulate enough energy to detect the pseudolite signal. In practice, duty cycles of at least 5% are needed to lock on to C/A code, allowing for a maximum of 20 pseudolites in a given area.

A Multi-frequency Pseudolite

FIG. 4 illustrates a multi-frequency pseudolite $1\text{-}i$ according to one embodiment of the invention. A multi-frequency pseudolite $1\text{-}i$ may include a receive antenna 217, a multi-frequency reference receiver 201, a control processor 202, a reference oscillator 203, a code generator 204, a pulse generator 205, multiple signal generators 210-1:K, a combiner 208 and a transmit antenna 207. These components may be interconnected as illustrated and as described herein.

The signal generators 210 may produce GNSS-like radio-frequency (RF) signals for the pseudolite $1\text{-}i$ to broadcast.

The signal generators 210 in the pseudolite $1\text{-}i$ may be any number. To operate in license-free RF spectrum bands currently available, the number may be two or three.

FIG. 7 is a table listing candidate frequency sets for two- and three-frequency systems incorporating an embodiment of the invention. For a two-frequency system, one frequency may be in the 902.0–928.0 MHz ISM band, and another frequency may be in the 2400.0 MHz–2483.5 MHz ISM band. So as to not disrupt the normal use of any incorporated GNSS (GPS, for example), preferably none of the signal generators operates on any of the GNSS frequencies (L1 (1575.42 MHz) and L2 (1227.60 MHz) for GPS, for example).

A signal generator 210 may include a phase-lock loop (PLL) 211, a filter 212, a microwave VCO 213, a mixer 214, a second filter 215 and a switch 216. These components may be interconnected as illustrated and as described herein.

The PLL 211 of a signal generator 210 may control the frequency produced by that signal generator 210 (the processor 202 controlling the PLL 211). The reference oscillator 203 may drive the PLL 211. The reference oscillator may be a low-cost temperature-controlled crystal oscillator (TCXO). The lower-frequency TCXO may stabilize the microwave-frequency carrier signal through the phase-lock loop feedback circuit 211, 212, 213.

The code generator 204 may generate a GPS P-code or C/A code (gold-code) spreading pattern that the mixer 214 mixes with the carrier. Codes other than the GPS P-code and C/A codes may be used for the spreading function. Because of the economics that flow from using existing GPS chipsets, however, the GPS P-code and C/A codes are the most likely choices for the spreading code.

The code generator 204 may also modulate low-rate data (50 to 1 k baud) on the carrier. The modulated data may include the surveyed location of the pseudolite, the pseudolite 1-$i$'s reference-oscillator offset from GPS time, and the satellite differential phase corrections and ephemeredes. Broadcasting all of this data on the pseudolite's ranging signal (the multiple RF signals) makes a separate differential reference station and subsequent communication link unnecessary. Multiple m separate data channels allows data to be sent in parallel (e.g., one byte can be distributed over two signal channels in four-bit chunks). This permits data rates up to m kbaud, where m is the number of frequencies in the system.

The filter 215 filters the mixed carrier, code, and data. The filtered signal may pass directly to the combiner 208, or if pulsing is employed, it may pass through an RF switch 216 that is controlled by a pulse generator 205.

The combiner 208 may sum the multiple signals from the signal generators 210, and the transmit antenna 207 may then broadcast them. The antenna 207 may be a wide-band antenna or may be separate narrow-band antennae. Whatever the antenna arrangement, coincident phase centers are preferred for all the frequencies involved. Otherwise, the position solution may be more challenging to calculate than presented herein.

A pseudolite #1-$i$ may include a multi-frequency reference receiver 2 capable of positioning from multi-frequency pseudolites. First, the receiver 2 provides synchronization to align code and carrier signals to a timing standard (GPS), and if pulsing is employed, triggering the pulse generator 205. Second, the receiver 2 enables the pseudolite 1-$i$ to collect satellite differential correction data and ephemeredes, to besent by way of the data communication link, which may be implemented within the modulated data message. Third, the reference receiver 2 enables the pseudolite 1-$i$ to automatically survey its location and then broadcast that information via the data communication link. Since the receiver 2 can use other multi-frequency pseudolites 1-$i$ to determine its position, the pseudolite 1-$i$ may be placed in an area of insufficient satellite coverage yet still be fully operational.

For indoor applications of the invention, the integrated reference receiver 201 may be omitted by connecting all the pseudolites to a common oscillator. The locations of the pseudolites in an indoor setting are surveyed by means other than GNSS, and the survey data entered—manually, for example—into the pseudolites for re-broadcast to users.

A Multi-frequency Receiver

FIG. 5 illustrates a multi-frequency receiver 2 or 201 according to one embodiment of the invention. The receiver 2 of FIG. 5 is the counterpart to the pseudolite 1-$i$ of FIG. 4, and both assume that GPS is the operative GNSS. It is worth noting here that a multi-frequency receiver in the context of this patent pertains to a receiver capable of interpreting the signals of a multi-frequency pseudolite as described herein. A multi-frequency receiver is different from a "dual-frequency" or "L1/L2" GPS receiver, which is a well-known technology.

The receiver 2 may include a receive antenna 317, a splitter 316, multiple phase tracking units 301-1:K, a reference oscillator 318, and a navigation processor 305. These components may be interconnected as illustrated and as described herein.

Within the receiver, each carrier frequency in the signal plan may be tracked by a separate phase tracking unit 301-1:K, where K is the number of carrier signals, including GPS frequencies. Each phase tracking unit operates in a manner known in the art for tracking a direct sequence, BPSK signal. One phase tracking unit is capable of measuring the code and carrier phases for one frequency in the signal plan for all satellites or pseudolites in view.

In one embodiment, the phase tracking unit comprises an RF front-end that translates one of the carrier frequencies to a lower intermediate frequency (IF) 315, a sampler (analog to digital converter) 302 and a GPS correlator chip 303. The chipset may include the sampler function. An example of such a chipset is the Zarlink (formerly Mitel/Plessey) 2021 12-channel GPS correlator. Circuitry to translate from an input carrier frequency to an IF is well known in the art of RF design. Another embodiment may use a Field-Programmable Gate Array (FPGA) instead of a commecial GPS correlator chipset to de-spread the signal 303. An FPGA embodiment allows non-GPS spreading codes to be used in the signal plan. A variety of FPGA chips are available from Xilinx, Altera, and other vendors.

Another embodiment of the phase tracking unit, shown in FIG. 6, may use a conventional GPS receiver 320 to track the code and carrier phases for one frequency in the signal plan. The conventional GPS receiver may comprise an RF front-end and sampler 321, a correlator chip 303, and a processor 322. A frequency converter 319 is required to translate from one of the carriers in the signal plan to GPS L1. A processor 322 on the conventional GPS receiver has software that executes only the code and carrier-phase tracking portion of the conventional GPS positioning algorithm. Such receivers are available from a variety of vendors. BAE Systems' Allstar and Superstar GPS receivers are small and low-cost by state-of-the art standards and could serve the tracking unit function.

Thus, a multi-frequency receiver may be built up from a set of such phase tracking units. Such a multi-frequency receiver may include three phase tracking units 301:1-3 under control of the navigation processor 305. Each of two of the phase tracking units 301:1-2 may handle a respective one of the two signals transmitted by the pseudolites 1-$i$. The third phase tracking unit 301:3 may directly measure the GNSS satellite signals.

More generally, the multi-frequency receiver 2 may include K+L phase tracking units 301:1-(K+L) under control of the navigation processor 305. Each one of K of the phase tracking units 301:1-K handles a respective one of the K frequencies transmitted by the pseudolites 1-i, while each one of L of the phase tracking units 301:(K+1):(K+L) handles a respective one of the L frequencies transmitted by the GNSS.

Like the pseudolite transmit antenna 207, the receiver antenna 317 may be a wide-band antenna or separate narrow-band antennae, in any event with a coincident phase center for all frequencies involved. A low-noise amplifier (LNA, not shown) may amplify the received signal, and the three-way (K+L) splitter may supply a signal to each of the phase tracking units 301:1-3.

The navigation processor 305 may run a process 304 to derive the code and carrier phase measurements 306 from raw in-phase and quadrature (IQ) measurements made by the correlator chips 303. Alternatively, the navigation processor may receive code and carrier phase measurements 306 directly from a processor 322 contained within each phase tracking unit. The navigation processor may also run a process 307 to collect all of the information 306 required to compute the navigation solution, including code and carrier phase measurements of the signals received at the receiver antenna 317, differential code and carrier phase measurements from the reference station, and system configuration data such as pseudolite locations, and sends this information to the navigation solution process 308. The receiver 2 outputs the navigation solution 309.

The navigation processor may use whatever information it has, including position and time estimates 310, to (1) decide which pseudolite or satellite PRN codes to search for 312 and (2) compute aiding information 311 in the form of Doppler offsets to be fed-forward to the phase tracking process 304.

Position Solution Using Multi-frequency Pseudolites and Receivers

A multi-frequency GNSS receiver 2 can calculate its position by measuring the code and carrier phases transmitted by a system 7 of multi-frequency pseudolites 1-i and processing these phase measurements with the algorithms described herein. The position calculation differs from the conventional GNSS position determination. (While any GNSS may be used to illustrate position solving, the following explanation assumes the GPS.)

Existing GPS receiver technology typically provides code-phase measurements with meter-level noise figures and carrier-phase measurements with centimeter-level noise figures. With four or more multi-frequency pseudolites in view and with good geometry, the multi-frequency GPS receiver can employ carrier-phase measurements and immediately achieve centimeter-level position solutions.

In embodiments described above, each pseudolite 1-i includes a reference receiver 2. An included reference receiver 2 can be assumed to be zero range from its respective pseudolite 1-i and to provide a direct measure of the difference between the local oscillator 203 and GPS time. From these assumptions, it follows that all phases between the pseudolite and a user can be considered differentially corrected and the only time bias in the system is between the mobile receiver and GPS time.

The parameters of interest in the position calculations are as follow:

$R_i$ True range between the mobile user and pseudolite i.
$\rho_i$ Precise range derived from phase measurements.
$f_j$ Frequency of carrier signal j, $j \in \{1 \ldots N_f\}$.

$\lambda_j$ Wavelength of carrier signal j, $\lambda_j = c/f_j$, where c is the speed of light.

$\phi_{ij}$ Code phase to pseudolite i for frequency j (differentially corrected).

$\psi_{ij}$ Carrier phase to pseudolite i for frequency j (differentially corrected).

T Range-equivalent of the offset between the mobile-receiver clock and GPS time.

$M_{ij}$ Code-phase cycle ambiguity from pseudolite i to mobile receiver for frequency j.

$N_{ij}$ Carrier-phase cycle ambiguity from pseudolite i to mobile receiver for frequency j.

$N_f$ Number of frequencies implemented in the ranging signal.

$\sigma_{cd}$ Variance of the code phase measurements (assumed same for all carrier frequencies).

$\sigma_j$ Variance of the carrier phase measurements for frequency j.

$W_{cd}$ Code phase noise as zero-mean Gaussian with variance $\sigma_{cd}$.

$W_j$ Carrier phase noise as zero-mean Gaussian with variance $\sigma_j$.

The first step of the positioning algorithm determines the precise ranges between the mobile user and each of the pseudolites. "Precise range" in this instance means that the range accuracy is established to better than one wavelength of the highest frequency employed. The second step extracts the position coordinates from the precise-range measurements. The second step is fairly well understood in the art—employing a non-linear least-squares algorithm, for example—and so only the first step is covered in detail.

The range $R_i$ from the pseudolite to receiver station is the magnitude of the difference between vectors P and $Q_i$ and is related to the code phase measurement $\phi_{ij}$ by equation (1):

$$\phi_{ij} = R_i + \tau + \lambda_{cd} M_{ij} + W_{cd} \tag{1}$$

As noted above, for the configuration under consideration, $\phi_{ij}$ is a differential code phase, and T is the offset between the mobile receiver's clock and GPS time. $M_{ij}$ is the code cycle ambiguity from the pseudolite i to the mobile receiver for frequency j.

For most applications of the present invention, $M_i$ can safely be assumed to be zero because the scale of the invention will be less than one code phase cycle (300 km) in any dimension. This simplifies the code measurement equation to equation (2):

$$\phi_{ij} = R_i + \tau W_{cd} \tag{2}$$

The carrier-phase measurements are similar in form, but the cycle ambiguities $N_{ij}$ must be resolved. Again, due to the co-location of the reference receiver with the pseudolite, the carrier-phase measurements are differential phases and the time bias is between the mobile receiver and GPS time:

$$\psi_{ij} = R_i + \tau + \lambda_j N_{ij} + W_j \tag{3}$$

The time bias, $\tau$, is common to all measurements and can be omitted from the equations for the time being. It will be re-introduced after the precise range is resolved:

$$\phi_{ij} = R_i + W_{cd} \tag{4}$$

$$\psi_{ij} = R_i + \lambda_j N_{ij} + W_j \tag{5}$$

Resolving the precise ranges involves superimposing all the probability density functions for the various carrier cycle ambiguities from a given pseudolite, centered around the code phase measurement and enveloped by the code-phase probability density function. The probability density function for a given carrier can be viewed as a comb with spacing between the "teeth" equal to the wavelength of that carrier. By superimposing combs of different spacing (the probability density functions for the various carrier signals), only one set of "teeth" overlap, representing the most probable solution. The width of the comb (and hence the total number of "teeth") is bounded by the probability density function for the code phase measurement.

The starting point for the resolution process is the approximate range provided by the code phases. If there are $N_f$ frequencies involved, then there will be $N_f$ code phase measurements from a given pseudolite. $\phi_{io}$ is the average of the code phases between pseudolite i and the mobile receiver:

$$\phi_{io} = \frac{1}{N_f} \sum_{j=1}^{N_f} \phi_{ij} \qquad (6)$$

Since the raw carrier phase measurements contain an arbitrary cycle ambiguity, this ambiguity is stripped off from the fractional phase and replaced with the closest number of integer wavelengths as provided by the code phase estimate $\phi_{io}$. The derived quantity is the centered carrier phase $l_{cij}$. In the following equation, the modulus operator strips off the integers from the raw carrier phase measurement to leave a fractional phase, and the floor function appends the range of the closest integer to the code phase estimate $\phi_{io}$:

$$\psi_{cij} = mod(\psi_{ij}, \lambda_j) + \lambda_j \text{floor}(\phi_{io}/\lambda_j) \qquad (7)$$

The centered carrier phase $l_{cij}$ serves as the location to center the probability density function for carrier j. After all of the probability density functions are superimposed, the highest probability integer indicates an offset from the original code phase estimate $\phi_{io}$. This offset is applied to the original code phase estimate to achieve the precise range $\rho_i$.

Sampled sequences of the probability density functions for all the carriers can be generated and then multiplied together to determine the highest probable cycle ambiguity solution. The range (length) of the sampled sequence is determined by the code phase variance $\sigma_{cd}$. The sequence is preferably at least 2–3 variances wide. The resolution of the samples is preferably finer than the resolution of the highest frequency carrier phase measurement (typically less than a centimeter). The sampled probability density function for pseudolite i, frequency j is represented as $\rho_{ijk}$, where k is the sample index and is directly related to the range by k·dr, where dr is the sample resolution. Assuming the carrier phase measurement noise is zero-mean Gaussian with variance $\sigma_j$, the probability density function $\rho_{ijk}$ is the superposition of independent Gaussian distributions, each with variance $\sigma_j$ and separation between centers of one carrier wavelength $\lambda_j$. Additionally, the entire distribution is shifted by the difference between the centered carrier phase, $l_{cij}$, and the code phase estimate $\phi_{io}$. $\rho_{ijk}$ can be represented mathematically as equation (8):

$$p_{ijk} = \sum_n e^{-\frac{(kdr - \lambda_j n + \psi_{cij} - \phi_{io})^2}{2\sigma_j^2}} \qquad (8)$$

Superimposing the probability density functions for all the carriers j for a given pseudolite i, and enveloping the code probability density function results in the probability density product sequence, $P_{ik}$.

$P_{ik}$ is characterized by a unique maximum value or spike that indicates the location in the sequence of the correct integer solution. $P_{ik}$ is formed by multiplying the code probability density sequence and the $\rho_{ijk}$ sequences together:

$$P_{ik} = e^{-\frac{(k \cdot dr)^2}{2\sigma_{cd}^2}} \sum_{j=1}^{N_f} p_{ijk} \qquad (9)$$

By finding the index, m, of the maximum value of $P_{ik}$, the offset between the code phase estimate and the precise range is determined to be m·dr. The precise range is thus computed as in equation 10:

$$\rho_i = \phi_{io} - m \cdot dr \qquad (10)$$

The precise ranges between all pseudolites and the mobile receiver can be found in this manner. It should be noted that the precise range established here is actually the precise range plus the time bias that was omitted early in the derivation. The procedure for extracting the position solution and the time bias from a set of precise range measurements such as these is well known in the art.

For universal application of the invention, preferably at least five pseudolites are in view at all times. This arrangement provides the highest performance available from the system. It is useful to know, however, the expected performance when fewer than five pseudolites are in view.

FIG. 7 shows a performance matrix for all combinations of satellites and pseudolites. When at least five pseudolites are in view, the user receiver can expect immediate integer acquisition, full integrity, and the highest level of accuracy. If four pseudolites and at least one satellite are in view, the system has similar performance—except that the integrity is not guaranteed without resorting to motion-based algorithms to independently resolve the cycle ambiguities for the satellites. These algorithms may take several minutes, depending on satellite coverage.

The need for integrity is highest when the navigation sensor is used in feedback control of safety-critical machinery. For existing man-in-the-loop operations this is not a firm requirement, but it can serve to improve the safety of these operations nonetheless. Full integrity monitoring does provide the means for achieving higher levels of automation in many systems. Situations in which there are fewer than four pseudolites but at least five ranging sources in total can achieve full accuracy and integrity, but resort to satellite motion to resolve cycle ambiguities. If at least one or more pseudolites are visible, the user will gain at least some enhancement to the conventional motion-based methods for cycle ambiguity resolution, because the cycles ambiguities to each of the pseudolites will be immediately known, leaving only those of the satellites to resolved by motion.

The expected performance of any set of frequencies to uniquely discern the correct integers can be determined by computing the probability of a cycle ambiguity occurring over the range of the code phase accuracy. An example of a candidate frequency set for each of a three-frequency and a four-frequency architecture are listed in FIG. 7. The table lists a fourth band designated for ISM in the 5725–5875 MHz range which remains as an option if the other bands are overcrowded by other radio equipment in the area of the application.

The present invention combines and extends the pseudolite technique with the dual frequency satellite technique to create apparatus and methods that address two fundamental shortcomings of Global Navigation Satellite Systems: (1) Immediate availability of carrier-phase accurate position information and (2) System availability in areas with limited sky visibility. Consequently, integer ambiguities can be determined extremely quickly and without any residual uncertainty as to the accuracy or fidelity of the wavelength ambiguity determination. This eliminates augmenting the resolution process with other techniques requiring satellite or vehicle motion. (Satellite motion takes time to produce a useful geometry change, while vehicle motion may not be useful or practicable in applications using slow or ponderous equipment.)

In one embodiment, the invention is a multi-frequency pseudolite that provides the signal-in-space needed by a receiver to determine the cycle ambiguity of the microwave carrier frequencies. The cycle ambiguity is determined with very high and quantifiable accuracy and integrity.

In another embodiment, the invention is a microwave-frequency receiver that leverages a multi-frequency pseudolite signal, as well as standard GPS satellite signals, to rapidly determine its position to the accuracy typical of carrier-phase differential GPS techniques.

In another embodiment, the invention leverages conventional GPS equipment, including GPS receivers and pseudolites, to reduce the cost of the overall system.

Indeed, the invention now being fully described, many changes and modifications that can be made thereto without departing from the spirit or scope of the appended claims will be apparent to one of ordinary skill in the art.

TABLE 2-continued

| Band (MHz) | Freq (×10.023 MHz) | Chipping Rates (×1.023 MHz) |
|---|---|---|
| 5725–5875 | 561 | 1, 2, 3, 5, 6, 10, 11 |
| | 562 | 1, 2, 4, 5, 10, 20 |
| | 563 | 1, 2, 5, 10 |
| | 564 | 1, 2, 3, 4, 5, 6, 8, 10, 12, 15, 20, 24 |
| | 565 | 1, 2, 5, 10, 25 |
| | 566 | 1, 2, 4, 5, 10, 20 |
| | 567 | 1, 2, 3, 5, 6, 9, 10, 15, 18, 21 |
| | 568 | 1, 2, 4, 5, 8, 10, 16, 20 |
| | 569 | 1, 2, 5, 10 |
| | 570 | 1, 2, 3, 4, 5, 6, 10, 12, 15, 19, 20, 25 |
| | 571 | 1, 2, 5, 10 |
| | 572 | 1, 2, 4, 5, 8, 10, 11, 13, 20, 22 |
| | 573 | 1, 2, 3, 5, 6, 10 |
| | 574 | 1, 2 |

What is claimed is:

1. A positioning system comprising a plurality of pseudolite transmitters and a receiver system:

each transmitter capable of transmitting a plurality of direct-sequence spread spectrum signals, each signal including a carrier frequency signal and a direct-sequence spreading code modulating said carrier signal at a code chipping rate; and the receiver system capable of:

a) receiving a direct-sequence spread spectrum signal selected from said plurality of signals;

b) determining a plurality of measurements including: a carrier phase measurement of each said carrier frequency signal; and a code phase measurement of each said spreading code; and c) calculating a range between the transmitter and the receiver system from said measurements wherein said range is determinable using a mathematical function of:

a first relationship between a first integer wavelength corresponding to said first carrier phase measurement and a first statistical property of said first code phase measurement, and a second relationship between a second integer wavelength corresponding to said second carrier phase measurement and a second statistical property of said second code phase measurement.

TABLE 1

| Signal Plan Objective | Options | Preferred Embodiment | Second Embodiment | Impact on other system components |
|---|---|---|---|---|
| Immediate Cycle Ambiguity Resolution | 1) 2 or more freq w/higher than conventional chipping rates  2) 3 or more freq w/standard chipping rates | F1 = 902.70 MHz, P-code at 6.138 MHz F2 = 2455.20 MHz, P-code at 25.575 MHz | F1 = 910.47 MHz, C/A code at 1.023 MHz F2 = 2404.05 MHz C/A code at 1.023 MHz F3 = 2475.66 MHz C/A code at 1.023 MHz | |
| Large Range of Operation | 1) Continuous broadcast w/codes much longer than C/A  2) TDMA pulsed output, standard C/A codes | Continous broadcast at least 1000:1 near-far ration (60 dB in power) | RTCM pulse pattern, at triple rate | 1) Receiver RF accept power > thermal noise; Receiver A/D accept > 60 dB dynamic range; Synchronization to reduce code/freq search space  2) Synchronization to coordinate TDMA pulse output |

TABLE 2

| Band (MHz) | Freq (×10.023 MHz) | Chipping Rates (×1.023 MHz) |
|---|---|---|
| 902–928 | 89 | 1, 2, 5 |
| | 90 | 1, 2, 3, 4, 5, 6 |
| 2400–2483.5 | 235 | 1, 2 |
| | 236 | 1, 2, 4, 5, 8, 10 |
| | 237 | 1, 2, 3, 5, 6, 10, 15 |
| | 238 | 1, 2, 4, 5, 7, 10, 14, 17, 20 |
| | 239 | 1, 2, 5, 10 |
| | 240 | 1, 2, 3, 4, 5, 6, 8, 10, 12, 15, 16, 20, 24, 25 |
| | 241 | 1, 2, 5, 10 |
| | 242 | 1, 2, 4, 5 |
| | 560 | 1, 2 |

2. The positioning system of claim 1, wherein said mathematical function is a product of said first relationship and said second relationship.

3. A transmittable signal plan for a ranging system based on electromagnetic radiation, the signal plan comprising:
   a first carrier frequency signal;
   a second carrier frequency signal;
   a first direct-sequence spreading code modulating said first carrier signal at a first code chipping rate; and
   a second direct sequence-spreading code modulating said second carrier signal at a second code chipping rate;
   wherein a reception of said signal plan in one measurement period can be used to determine a plurality of measurements including:
      a first carrier phase measurement of said first carrier frequency signal;
      a second carrier phase measurement of said second carrier frequency signal;
      a first code phase measurement of said first spreading code; and
      a second code phase measurement of said second spreading code; and
   wherein said range is determinable using a mathematical function of:
      a first probabilistic relationship between a first integer wavelength corresponding to said first carrier phase measurement and a first statistical property of said first code phase measurement, and
      a second probabilistic relationship between a second integer wavelength corresponding to said second carrier phase measurement and a second statistical property of said second code phase measurement.

4. The transmittable signal plan of claim 3, wherein said mathematical function is a product of said first probabilistic relationship and said second probabilistic relationship.

5. The transmittable signal plan of claim 3, wherein said first and second probabilistic relationship provides at least 50% probability that a difference between an actual range and said range estimate is accurate to within the lesser of a first half wavelength corresponding to said first carrier phase measurement and a second half wavelength corresponding to said second carrier phase measurement.

6. The transmittable signal plan of claim 3, wherein said range is determinable with an accuracy to within a tolerance corresponding to a length of the shortest wavelength selected from:
   a first wavelength corresponding to said first carrier phase measurement; and a second wavelength corresponding to said second carrier phase measurement
   when said probabilistic relationship represents maximum likelihood outcome and is used to determine:
   a first number of wavelengths corresponding to said first carrier phase measurement; and
   a second number of wavelengths corresponding to said second carrier phase measurement.

\* \* \* \* \*